United States Patent [19]

Benoit

[11] Patent Number: 4,963,388
[45] Date of Patent: Oct. 16, 1990

[54] METHOD FOR FORMING PARTICLE-IMPREGNATED ONE-SIDED CLING STRETCH WRAP FILM

[75] Inventor: Gordon L. Benoit, Macedon, N.Y.

[73] Assignee: Mobil Oil Corporation, Fairfax, Va.

[21] Appl. No.: 313,402

[22] Filed: Feb. 21, 1989

Related U.S. Application Data

[62] Division of Ser. No. 39,891, Apr. 17, 1987, Pat. No. 4,833,017.

[51] Int. Cl.$^5$ .......................... B05D 5/08; B05D 1/06; B05D 7/04; B29C 59/04

[52] U.S. Cl. .......................... 427/29; 427/14.1; 427/32; 427/180; 264/24; 264/130; 264/131

[58] Field of Search .................. 427/32, 180, 25, 14.1, 427/29; 264/24, 130, 131

[56] References Cited

U.S. PATENT DOCUMENTS

| | | | |
|---|---|---|---|
| 2,235,516 | 3/1941 | Cornwell | 427/180 X |
| 3,277,227 | 10/1966 | Kesseler et al. | 264/216 |
| 3,359,128 | 12/1967 | Humphrey et al. | 427/180 X |
| 3,645,992 | 2/1972 | Elston | 526/169.2 |
| 4,011,382 | 3/1977 | Levine et al. | 526/96 |
| 4,076,698 | 2/1978 | Anderson et al. | 526/348.6 |
| 4,079,565 | 3/1978 | Lancaster, III et al. | 53/397 |
| 4,163,831 | 8/1979 | Gessell | 526/153 |
| 4,205,021 | 5/1980 | Morita et al. | 525/240 |
| 4,302,565 | 11/1981 | Goeke et al. | 526/88 |
| 4,302,566 | 11/1981 | Karol et al. | 526/125 |
| 4,311,808 | 1/1982 | Su | 525/222 |
| 4,359,561 | 11/1982 | Fraser et al. | 526/88 |
| 4,367,256 | 1/1983 | Biel | 428/218 |
| 4,399,173 | 8/1983 | Anthony et al. | 428/35.2 |
| 4,399,180 | 8/1983 | Briggs et al. | 428/35 |
| 4,409,776 | 10/1983 | Usui | 53/399 |
| 4,418,114 | 11/1983 | Briggs et al. | 428/218 |
| 4,430,289 | 2/1984 | McKinney et al. | 264/564 |
| 4,436,788 | 3/1984 | Cooper | 428/483 |
| 4,518,654 | 5/1985 | Eichbauer et al. | 428/331 |
| 4,522,987 | 6/1985 | Hogan et al. | 526/106 |

FOREIGN PATENT DOCUMENTS

| | | | |
|---|---|---|---|
| 775371 | 5/1957 | Canada | 427/180 |
| 19528 | of 1980 | Japan | |

Primary Examiner—Evan Lawrence
Attorney, Agent, or Firm—Alexander J. McKillop; Charles J. Speciale

[57] ABSTRACT

A method for forming a one-sided cling stretch wrap film by adhering a particulate antiblock to one surface of the film while the surface is in a semiplastic state, applying a particle-embedding force to the surface and removing excess particulate matter. The thermoplastic stretch wrap film exhibits a significant level of cling on one surface but no appreciable cling force on the other, the latter surface exhibiting a slide property when in contact with a film or like surface due to the presence of particulate antiblock agent mechanically bonded thereto. The film can be used to overwrap one or a group of articles to form a unitized packaged unit employing any of the known and conventional tension-wrapping techniques. Because of its one-sided cling and slide capabilities, pallet loads overwrapped with the film and in mutual contact avoid film tearing or destruction when the pallet loads are separated from each other.

3 Claims, 1 Drawing Sheet

METHOD FOR FORMING PARTICLE-IMPREGNATED ONE-SIDED CLING STRETCH WRAP FILM

This is a divisional of copending application Ser. No. 039,891 filed on Apr. 17, 1987 now U.S. Pat. No. 4,833,017.

BACKGROUND OF THE INVENTION

This invention relates to stretch wrap thermoplastic film, methods for forming a unitized plurality of goods, e.g., a pallet load, by application of stretch wrap film thereto and the stretch-wrapped units resulting therefrom. The invention is particularly concerned with a method of forming a thermoplastic stretch wrap film possessing a significant cling force on one surface thereof and no substantial cling force on the other surface thereof, the latter surface possessing a slide property when in contact with a like surface with relative motion therebetween due to the presence of particulate antiblock agent mechanically bonded to said surface.

The use of thermoplastic stretch wrap film for the overwrap packaging of goods and, in particular, the unitizing of pallet loads, constitutes a commercially significant application of polymer film. Overwrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overlapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods.

Some resins which have been used in the fabrication of stretch wrap film are polyethylene, polyvinyl-chloride and ethylene vinyl acetate. A fairly recent development has been the utilization of linear low density polyethylene (LLDPE) in the manufacture of stretch wrap film, e.g., as described in U.S. Pat. Nos. 4,399,180, 4,418,114 and 4,518,654, the contents of which are incorporated by reference herein. The excellent toughness and puncture resistance properties of LLDPE makes it an excellent resin for such an application. LLDPE and methods for its manufacture are described in, among others, U.S. Patent Nos. 3,645,992; 4,076,698; 4,011,382; 4,163,831; 4,205,021; 4,302,565; 4,302,566; 4,359,561; and, 4,522,987. Films fabricated from the typical LLDPE resins of commerce possess little or no cling property on either surface thereof in the absence of added cling agent.

Thermoplastic films possessing a cling property are known in the art. U.S. Pat. No. 4,311,808 describes a cling film containing a homogeneous mixture of polyisobutylene, ethylene-propylene and a low density polyethylene.

U.S. Pat. No. 4,367,256 describes a cling wrap plastic film based on a blend of high pressure low density polyethylene (HPLDPE) and LLDPE in which the latter resin represents from 5–16 weight percent of the total. In one embodiment, this film is sandwiched between two HPLDPE films.

U.S. Pat. No. 4,399,173 describes a multilayer plastic film free of melt fracture which is suitable for a variety of applications including, by implication, the stretch wrapping of goods. The film possesses a core layer of LLDPE resin of melt index 0.2–3.0 decigrams per minute and skin layers of LLDPE resin of melt index 5.0–20.0 decigrams per minute.

U.S. Pat. Nos. 4,399,180 and 4,418,114 describe a coextruded composite stretch wrap film in which an LLDPE core layer is surfaced with HPLDPE skin layers.

In the one-sided cling stretch wrap film of U.S. Pat. No. 4,518,654, layer A fabricated from a resin possessing an inherent cling property and/or a cling property resulting from the incorporation of a cling additive therein is coextruded with layer B fabricated from a resin exhibiting little if any cling, layer B exhibiting a slide property when in contrast with a layer of itself with relative motion therebetween. Layer B can contain from about 0.05 to about 2.0 weight percent of such antiblocking materials as crystalline and amorphous silicate, e.g., $Na_2O.Al_2O_3.SiO_2.4H_2O$, diatomaceous earth, talc, and the like, evenly distributed therein. In each of the two working examples of this patent, layer A is an LLDPE film containing a cling additive, namely, polyisobutylene, the aforesaid synthetic sodium silicate particles being uniformly incorporated throughout layer B of the film of Example 1 and amorphous silica particles being uniformly incorporated throughout layer B of the film of Example 2. As noted in U.S. Pat. No. 4,518,654, the presence of cling on one side of the stretch wrap film but non-cling/slide properties on the other overcomes the problem of the tendency of a pallet load overwrapped with a stretch wrap film possessing cling on both of its major surfaces from destructively pulling away from a similarly overwrapped pallet load with which it is in contact when one of the pallet loads is moved relative to the other (as would be the case in the fork lift truck-handling of such overwrapped pallet loads stored in a warehouse).

U.S. Pat. No. 4,436,788 describes a stretch wrap film obtained from a mixture of 40–90 weight percent ethylene-vinyl acetate copolymer and 8–55 weight percent LLDPE.

Japanese Laid-Open Patent No. 19528/1980 describes a two-layer stretch wrap film in which a low density polyethylene layer is coextruded with a low density polyethylene layer containing from 3 to 20 weight parts of a tackifier, e.g., a polyisobutylene having a molecular weight of 200 to 300.

As previously indicated, methods of stretch wrapping articles, containers, etc., are known. U.S. Pat. No. 3,986,611 describes a tension-wrapped palletized load obtained with a stretch wrap film possessing a cling additive.

U.S. Pat. No. 4,079,565 describes a stretch-wrapped package, process and apparatus which employs a stretch wrap polyethylene film.

U.S. Pat. No. 4,409,776 discloses a method and apparatus for packing articles with a composite stretch wrap film one surface of which is nonadhesive. The adhesive surface is obtained with an "adhesive film" such as one fabricated from ethylene-vinyl acetate copolymer, 1,2-polybutadiene or styrenebutadiene copolymer and the nonadhesive surface is obtained with a "nonadhesive film" such as one fabricated from a crystalline polyolefin, e.g., polyethylene, polypropylene or ethylene-propylene copolymer.

It is an object of the present invention to provide a thermoplastic stretch wrap film of simplified construction, e.g., a monolayer film, possessing a significant cling property on at least one of its major surfaces and a slide property on its other surface.

It is another object of the present invention to provide a stretch wrap film fabricated from an LLDPE resin inherently exhibiting a significant level of cling on one surface thereof in the absence of cling additive and a slide property on the opposite surface thereof due to the presence of particulate antiblock agent mechanically bonded to said surface.

Other objects of the invention include the use of a stretch wrap film of the aforementioned characteristics in the overwrapping of a plurality of goods, e.g., a pallet load, to provide a unitized packaged unit.

SUMMARY OF THE INVENTION

In accordance with the foregoing objects, a stretch wrap film is provided which comprises a layer of thermoplastic film possessing a significant cling property on one surface thereof and no significant cling property on the opposite surface thereof, the latter surface possessing a slide property when in contact with a like film surface with relative motion therebetween due to the presence of particulate antiblock agent mechanically bonded to said surface.

The term "antiblock" agent shall be understood herein to mean any material which is effective to prevent or discourage any significant degree of cling between the surface of the film to which it is applied and a like film surface and to confer a slide property on said surface relative to a like film surface.

The foregoing film possesses several advantages over a film in which antiblock agent is distributed substantially uniformly throughout a discrete film layer as, for example, in the multilayer film of U.S. Pat. No. 4,518,654 supra. As previously noted, particulate antiblock agent is uniformly distributed throughout non-cling layer B of this film. Not only do the antiblock agent particles which are not at the surface of this film layer contribute nothing to the non-cling/slide properties of such surface (and as such, can be regarded as wasted material), their presence within the interior of film layer B can serve as points of tear and/or fracture initiation which compromise the tear and puncture resistance properties of the total film structure. In contrast to this arrangement, the particulate antiblock agent in the stretch wrap film of this invention is applied to the one film surface only after the film has been formed, e.g., by slot-cast or blown tube extrusion. Thus, only the composition and properties of the film at its surface are altered or affected, the composition and properties of the rest of the film remaining essentially unchanged.

Another significant advantage of the stretch wrap film is that it can, if desired, be fabricated from a monolayer thus avoiding the material and/or processing costs associated with the production of a multilayer stretch wrap film.

The stretch wrap film of this invention can be used to overwrap one or a group of articles to form a unitized monolithic packaged unit employing any of the known and conventional tension-wrapping techniques such as those described above.

DESCRIPTION OF THE PREFERRED EMBODIMENTS

Any thermoplastic film-forming resin which is capable of being fashioned into a stretch wrap film is suitable for use herein. Films formed from the polyolefin homopolymers and copolymers, with and without minor amounts of blending, or alloying, resins, are generally preferred. Examples of suitable film-forming resins include the polyethylenes, e.g., HPLDPE and LLDPE resins, ethylene-vinyl acetate copolymer, ethylene-vinyl acetate-vinyl alcohol terpolymer, ethylene-propylene copolymer, ethylene-butene-1 copolymer, ethylene-propylene-butene-1 terpolymer, crystalline polypropylene, polybutene-1, and the like.

The film can be one which inherently possesses a significant cling property, e.g., one fabricated from an LLDPE film of relatively high n-hexane extractibles content as more fully described below, whose natural cling force may be enhanced or supplemented by the addition of one or more cling additives. The film can also be one which initially possesses little if any inherent cling force, e.g., a film made from LLDPE resins of typically low n-hexane extractibles content referred to above, and to which one or more cling agents have been added. Either type of LLDPE resin, especially the former, is preferred for use in fabricating the stretch wrap film of this invention.

Cling additive, where present, can be selected from any of the materials previously used to confer a cling force to thermoplastic film. Examples of such materials include ethylene-vinyl acetate copolymers, polyisobutylenes of relatively low molecular weight, e.g., from about 200 to about 300, fatty acid glycerides such as the glycerol oleates, alkali metal sulfosuccinates, amorphous atactic polypropylenes, e.g., those having average molecular weights of about 2000, polyterpenes, and so forth. The cling additive can be present in the film in widely varying concentrations, e.g., from about 0.5 to about 10, and advantageously, from about 1 to about 5, weight percent of the film-forming resin component.

Figure 1:
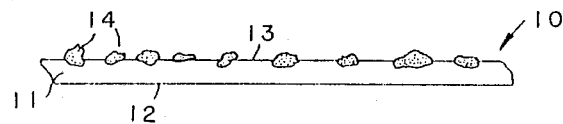
FIG. 1 is a schematic representation of a stretch wrap film of this invention; and, FIG. 2 is a schematic representation of a process for fabricating the film of this invention.

For reasons of cost, it is preferred to provide the stretch wrap film of the present invention as a single film layer possessing a significant inherent and/or imparted cling property on one surface and non-cling/slide properties on the other surface. Such an embodiment is schematically depicted in FIG. 1 in which a cross section of film 10, blown or cast from a suitable resin 11 such as LLDPE, and shown greatly exaggerated for purposes of illustration, possesses inherent or added cling on surface 12 and a slide property on non-cling surface 13 conferred by particles of antiblock agent mechanically bonded thereto.

Figure 2:
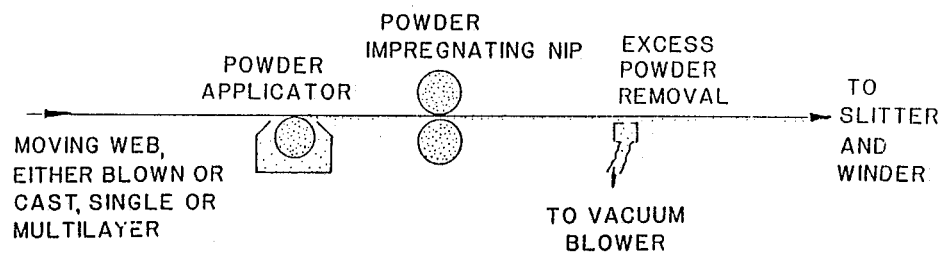

This film as well as the multilayer variations thereof can be provided in the manner schematically shown in FIG. 2. Thus, a blown or cast monofilm or coextruded multilayer film possessing cling on the upper surface thereof and whose surfaces are still hot enough to be in a semi-plastic state is passed over a powder applicator, e.g., of the blower-type, which directs a stream of particulate antiblock agent against the lower surface of the film. A quantity of the powder, specific useful levels of which can be experimentally calculated for a given film formed under given film-forming conditions, will adhere to the semi-plastic lower surface of the film and, following passage of the film through a pair of rolls, will become mechanically bonded thereto. Ordinarily, from about 0.01 to about 1.0 or more, and preferably from about 0.1 to about 0.5, weight percent of particulate antiblock agent by weight of the resin component of the entire film structure will be taken up by the under surface of the film in this manner and more or less become uniformly distributed on such surface. These levels of particle impregnation are generally quite effective in overcoming and rendering negligible the cling force exhibited by this surface of the film and imparting a significant slide property thereto. Any non-adherent antiblock agent particles can be conveniently removed by application of vacuum to the under surface of the film. Finally, the one-sided cling stretch wrap film can be subjected to one or more downstream operations such as surface treatment by flame, chemical or corona discharge, slitting, winding, etc.

When a blown tube of film is involved, the particles of antiblock agent can be applied either to the interior or to the exterior surface of the still-hot film. In the case of the former, a "cloud" of particulate can be formed within the film tube or bubble; in the case of the latter, an annular powder spraying element can be provided which completely surrounds the film tube and directs the powdery antiblock agent against this surface It is also within the scope of the invention to reheat a film produced by any film forming operation to the point where particles of antiblock agent directed aginst one of its surfaces will mechanically bond thereto.

Alternatively, particulate antiblock agent can be electrostatically deposited upon the one surface of the film employing known techniques and equipment, e.g., the Series 400 Dry Wax Applicator manufactured by Oxy-Dry Corporation, Roselle, N.J.

The particulate antiblock agent can be selected from amongst any of a wide variety of inorganic and organic materials which impart non-cling/slide properties to the surface of a thermoplastic film. Inorganic materials which, in powder form, are useful as antiblock agents include those disclosed in U.S. Pat. No. 4,518,654, supra, and generally include such materials as the silicas, diatomaceous earth, calcium silicate, bentonite, clay, talcs, etc. Organic materials include starches and various kinds of finely divided polymeric materials, e.g., polyethylenes. The average particle size of the antiblock agents can vary widely, e.g., from about 10 to about 200, and preferably from about 20 to about 100, millimicrons.

Although the film of the present invention is preferably realized in the form of a single layer, it is also within the scope of this invention to provide a multilayer film, or laminate, made up of two, three or even more individual layers. In the multilayer embodiment of the film herein, the exposed surface of one outer layer will exhibit a significant cling force while the exposed surface of the other outer layer will exhibit non-cling/slide properties. For example, a two layer structure can be provided in which an LLDPE-based layer possessing inherent cling and/or cling additive is coextruded with an HPLDPE-based layer impregnated with particulate antiblock agent as described above. In one three-layer laminate embodiment of the film herein, an LLDPE core layer is coextruded with a first surface layer based on EVA copolymer which provides an effective level of cling force and a second surface layer of HPLDPE containing particulate antiblock agent mechanically bonded to its exposed surface. Other combinations are, of course, possible.

As previously stated and due to its excellent physical properties such as high tear strength and excellent puncture resistance, the LLDPE resins are preferred for the construction of the present film. The term "LLDPE" is to be understood in the generally recognized sense of a copolymer of ethylene and small amounts, e.g., from 1 to about 10 weight percent, of at least one other copolymerized alpha-monoolefin comonomer possessing from 4 to about 10, and preferably, from 5 to 8, carbon atoms. Typical comonomers include butene-1, 1,3-methyl-butene-1, 1,3-methyl-pentene-1, hexene-1, 4-methylpentene-1, 3-methyl-hexene-1; octene-1, decene-1, etc. The LLDPE resins are prepared at relatively low pressures employing coordination-type catalysts. Reference may be made to U.S. Pat. Nos. 3,645,992; 4,076,698; 4,011,382; 4,163,831; 4,205,021; 4,302,565; 4,302,566; 4,359,561; and 4,522,987, supra, for more details of the manufacture and properties of LLDPE resins including those which are useful herein. An especially preferred type of LLDPE resin is one containing an unusually high content of n-hexane extractibles since such a resin can possess a fairly high level of cling without the need to add cling-conferring materials. Although it has not been confirmed that the n-hexane extractibles are, in fact, the cause of the inherent cling property of a film fabricated from such a resin, a correlation between cling and the level of such extractibles has been observed lending support to the view that the extractibles are indeed responsible for the cling behavior. As measured by the n-hexane extractibles method described in 21 C.F.R. 177.1520 to which reference may be made for specific details, an LLDPE film of about 1.5 mils thickness containing from about 3 weight percent up to as high as 15 weight of such extractibles will exhibit a significant level of cling. Preferably, the LLDPE film or film layer herein will contain from about 4 to about 10 and still more preferably, from about 5 to about 8, weight percent of n-hexane extractibles.

The level of n-hexane extractibles in such a film can also be expressed in terms of a specific cling force. Thus, the n-hexane extractible component of the LLDPE film can be such as to provide a cling force of at least about 75 grams, preferably at least about 100 grams and more preferably at least about 200 grams. Cling forces exceeding 200 grams, e.g., 300-400 grams, can also be achieved. The preferred high n-hexane extractibles LLDPE resins of this invention have a density ranging from about 0.905 to about 0.940 gm/c.c. and a melt index of from about 1 to about 6. Such resins can contain known and conventional cling additives, e.g., any of those previously mentioned, to augment the cling property which they already inherently exhibit.

Film thickness, whether of a monolayer or a multilayer film, can vary widely and, in general, can be a thickness which is typical for stretch wrap films. A total film thickness of from about 0.4 to about 2.5 mils, preferably from about 0.5 to about 0.9 mils, is suitable for most applications. In the case of multilayer films constructed in accordance with this invention, the outer layer(s) can represent from about 10 to about 90, and preferably from 30 to about 80, percent of the total gauge thickness with the other layer(s) representing the balance of the thickness.

Either or both major surfaces of the film can be treated by such known and conventional post-forming operations as corona discharge, chemical treatment, flame treatment, etc., to modify the printability or ink receptivity of the surface(s) or to impart other desirable characteristics thereto.

The stretch wrap film of this invention can, if desired, be provided in the non-stretched, i.e., unoriented, or at most only modestly stretched, state prior to use or it can be provided as a pre-stretched film with little, if any, additional stretch being applied to the film at the time of use. Thus, the film herein can be capable of undergoing stretch from about 0 to about 400, and preferably from about 75 to about 250, linear percent during the overwrapping operation.

Where the manufacture of a multilayer film is concerned, it is preferred to employ known and conventional techniques of coextrusion to assemble the composite structure. Reference may be made to U.S. Pat. No. 3,748,962, the contents of which are incorporated by reference herein, for details of a coextrusion procedure which can be employed in the fabrication of a multilayer film in accordance with this invention.

It is, of course, to be understood that the film of this convention can contain one or more other known and conventional film additives, e.g., fillers, pigments, antioxidants, UV stabilizers, and the like, in the customary amounts.

The following examples are illustrative of the one-sided cling stretch wrap film of this invention.

EXAMPLE 1

An LLDPE resin (ethylene-octene-1 copolymer) is extruded at 520° F. through a slot die onto a cast roll at line speeds of 750 ft/min to provide a monolayer film of about 0.8 mils. The cling force of this film is about 160 gm, one which renders the film suitable for commercial stretch wrap application with or without added cling agent. Before the surfaces of the film have had an opportunity to completely set, approximately 0.1 weight percent of particulate aluminum silicate $Na_2O \cdot Al_2O_3 \cdot SiO_2 \cdot 4H_2O$ (average particle size of 3–4 microns) antiblock agent is mechanically bonded to the under surface of the film employing the powder applicator method described in connection with FIG. 2. The resulting film continues to exhibit a relatively high cling force on its upper surface but essentially no cling force on its under surface which instead exhibits a slide property when in contact with a layer of itself.

EXAMPLE 2

Example 1 is substantially repeated with a monolayer film extruded from an LLDPE resin possessing little inherent cling force but containing 3 parts of polyisobutylene (number average molecular weight of 2060) to impart a relatively high level of cling force thereto. The resulting stretch wrap film possesses much the same surface properties as the film of Example 1.

EXAMPLE 3

A two layer film structure of about 0.8 mils total thickness is formed by coextruding an EVA copolymer film of about 0.1 mils thickness and possessing a high level of cling with the LLDPE resin of Example 2 of about 0.7 mils thickness and to which no cling agent is added. The exposed surface of the LLDPE layer is then provided with a superficially embedded coating of particulate antiblock agent in essentially the same manner as in Example 1. The resulting stretch wrap film possesses properties at its exposed surfaces similar to the films of Examples 1 and 2.

EXAMPLE 4

Example 3 is substantially repeated but with a three layer film structure formed by coextruding the LLDPE film (about 0.6 mils thickness) with an EVA copolymer film (about 0.1 mils thickness) on one surface and an HPLDPE film (about 0.1 mils thickness) on the other. The exposed surface of the EVA surface layer exhibits cling, and the exposed surface of the HPLDPE film exhibits non-cling/slide properties, similar to those of the films of Examples 1, 2 and 3.

What is claimed is:

1. A method for forming a one-sided cling stretch wrap film which comprises
    (a) providing a stretch wrap film structure in which one exposed surface exhibits a significant cling property;
    (b) adhering a particulate antiblock to the other exposed surface while the surface is in a semi-plastic state;
    (c) applying a particle-embedding force against said other exposed surface having particulate antiblock adhered thereto; and
    (d) removing excess particulate antiblock which has not been adhered and embedded into said other exposed surface, thereby forming a one-sided cling stretch wrap film possessing a cling property on one surface, and a slide property on the other surface of the film.

2. The method of claim 1 wherein step (b) is carried out by directing a stream of particulate antiblock agent against said other exposed surface.

3. The method of claim 1 wherein step (b) is carried out by electrostatically adhering particulate antiblock agent to said other exposed surface.

* * * * *